United States Patent [19]
Bowen et al.

[11] Patent Number: 5,901,148
[45] Date of Patent: May 4, 1999

[54] RING DOMAINS FOR BANDWIDTH SHARING

[75] Inventors: Ronald A. Bowen, Sterling; Jon F. Hauris; Donald R. Staddon, both of Manassas, all of Va.

[73] Assignee: Lockheed Martin Corporation, Bethesda, Md.

[21] Appl. No.: 08/812,184

[22] Filed: Mar. 6, 1997

[51] Int. Cl.[6] .................................................. H04L 12/42
[52] U.S. Cl. ...................... 370/452; 370/906; 395/200.33
[58] Field of Search ..................... 370/403, 404, 370/405, 406, 906, 424, 460, 450, 452, 454; 395/200.33, 200.81; 359/118, 117, 119

[56] References Cited

U.S. PATENT DOCUMENTS

| | | | |
|---|---|---|---|
| 4,549,292 | 10/1985 | Isman et al. | 370/424 |
| 4,567,590 | 1/1986 | Bederman | 370/452 |
| 4,587,650 | 5/1986 | Bell | 370/454 |
| 4,637,014 | 1/1987 | Bell | 370/449 |
| 4,858,232 | 8/1989 | Diaz et al. | 370/465 |
| 5,001,707 | 3/1991 | Kostipaiboon et al. | 370/440 |
| 5,003,531 | 3/1991 | Farinholt et al. | 370/223 |
| 5,245,605 | 9/1993 | Ofek | 370/452 |
| 5,327,428 | 7/1994 | Van As et al. | 370/353 |
| 5,361,261 | 11/1994 | Edem et al. | 370/445 |
| 5,517,498 | 5/1996 | Hauris et al. | 370/431 |
| 5,526,356 | 6/1996 | Kim et al. | 370/403 |

FOREIGN PATENT DOCUMENTS

0523874A2  1/1993  European Pat. Off. .

OTHER PUBLICATIONS

IBM Technical Disclosure Bulletin, "Isochronous Transmission on Top of Token Ring LAN", vol. 36, pp. 145–150., Aug. 08, 1993.

*Primary Examiner*—Chau Nguyen
*Assistant Examiner*—Soon-Dong Hyun
*Attorney, Agent, or Firm*—Lane, Aitken and McCann

[57] ABSTRACT

A server, and a number of client stations interconnected by a token ring network, specifically an FDDI-II network. The FDDI-II ring is connected in a star-ring topology, with the server and the clients preferably connected to the network through a wiring closet, as is the usual practice for such a topology. The server has separate physical connections to the single FDDI-II ring with each physical connection to the ring providing access to a separate physical domain. This partitions the same ring into different physical domains, so that an increase in the total effective bandwidth of the network is achieved by the server reallocating the same isochronous bandwidth in each of the domains for reuse by the server. An allocation of bandwidth in an isochronous channel in one domain can be reused by the server in another physical domain.

4 Claims, 1 Drawing Sheet

RING DOMAINS FOR BANDWIDTH SHARING

BACKGROUND OF THE INVENTION

1. Field of the Invention

This invention relates to a method and apparatus for increasing the effective bandwidth of isochronous, ring networks, and more particularly to a method and apparatus for increasing the effective bandwidth of networks conforming to FDDI-II standards.

2. Description of the Prior Art

The Fiber Distributed Data Interface (FDDI-II) standard prescribes a high-performance, fiber optic, isochronous, ring Local Area Network (LAN) running at 100 megabits per second (Mbps). Such networks provide a high bandwidth, general purpose interconnection among, for example, processors. However, even 100 Mbps is not sufficient bandwidth for many high data rate applications that exist today. In some client/server applications, such as those which manage large video disk arrays, the isochronous bandwidth requirement of the server for all the clients on the network is in excess of 100 Mbps. At the same time, it is highly desirable that such client/server networks conform to existing FDDI-II standards, using commercially available FDDI-II hardware, cabling, cycle structure, and protocols.

FDDI-II is a high-performance, fiber optic, token ring LAN running at 100 MBS. FDDI-II is a successor to FDDI with a modification to handle synchronous circuit-switched pulse code modulated (PCM) data for voice or ISDN traffic, in addition to ordinary data. In addition to regular (asynchronous) frames for ordinary data, special frames are permitted for isochronous circuit switched data. These frames are generated every 125 microseconds by a master station. The FDDI-II cycle structure is defined in Section 5 of the ANSI FDDI Hybrid Ring Control standard (X3T9/89-43 Rev 6.3) and incorporated herein by reference. Each new cycle or frame consists of control and data bytes or octets. The master station adjusts the latency of the FDDI-II ring so that there are always an integral number of these frames or cycles on the ring. Each frame is partitioned into four parts: a preamble, a cycle header, a dedicated packet group, and sixteen, wideband channels (WBCs). Each wideband channel can be dynamically allocated to either isochronous or packet data use. For isochronous use, each wideband channel provides 6.144 Mbps of bandwidth, and consists of 96 octets interleaved across the cycle. Once a station has acquired one or more time slots in a frame, those slots are reserved for it until they are explicitly released. The allocation of bandwidth to isochronous users is defined in Section 9.3 of the ANSI FDDI Station Management-2 Isochronous Services (SMT-2-IS) standard (X3T9/93-122 Rev 3.0).

The FDDI-II ring is a collection of ring interfaces connected by point-to-point lines. Each bit arriving at an interface is copied into a buffer and then copied out onto the ring again. This copying step introduces a 1-bit delay at each interface. A token (i.e. a special bit pattern) circulates around the ring whenever all stations are idle. When a station wants to transmit a frame of packet data, it is required to first seize the token and remove it from the ring before transmitting. Bits that have been propagated around the ring come back to the transmitting interface and are removed from the ring by the sender. In FDDI-II, a transmitting-interface may put a new token on the ring as soon as it has finished transmitting its frames.

Isochronous WBCs can be subdivided into individual transmission channels. A transmission channel consists of a contiguous sequence of octets within a WBC. Each data octet of a transmission channel provides 64 kbps of isochronous bandwidth. A logical channel is a unit of allocation that may consist of one or more transmission channels. WBCs are subdivided into separate logical channels to permit simultaneous, independent isochronous dialogues.

An FDDI-II management agent, such as a call control, must receive an allocation of isochronous bandwidth before completing a connection between two or more isochronous users. It is the responsibility of a Channel Allocator (CA) to create logical channels and assign isochronous bandwidth to those channels for use by call control.

Existing data base management routines are useful to a channel allocator in optimizing the way logical channels are created from a pool of bandwidth. One way that a channel allocator can manage bandwidth allocation for the different physical ring domains is defined in U.S. Pat. No. 5,422,883 which is incorporated herein by reference. The use of such routines is outside the scope of this patent. The operation of a channel allocator as defined in the FDDI-II standards will require modifications to account for the different physical ring domains that are described below.

U.S. Pat. No. 5,517,498 discloses a method of extending the effective bandwidth of a ring network connecting a plurality of stations connected one to the next. Here, some or all of the stations on the network comprise a group of contiguous stations that only communicate with one another. Outside the group, the bandwidth assigned to the group can be assigned to another such group.

BRIEF DESCRIPTION OF THE INVENTION

An object of this invention is the provision of a ring network, such as an FDDI-II network for client-server applications, in which the ring network is partitioned into physical domains, and the same isochronous bandwidth is allocated to each domain.

Briefly, this invention contemplates the provision of a server, and a number of client stations interconnected by a token ring network, specifically an FDDI-II network. The FDDI-II ring is connected in a star-ring topology, with the server and the clients preferably connected to the network through a wiring closet, as is the usual practice for such a topology. The server has separate physical connections to the single FDDI-II ring with each physical connection to the ring providing access to a separate physical domain. This partitions the same ring into different physical domains, so that an increase in the total effective bandwidth of the network is achieved by the server reallocating the same isochronous bandwidth in each of the domains for reuse by the server. An allocation of bandwidth in an isochronous channel in one domain can be reused by the server in another physical domain.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF THE PREFERRED EMBODIMENTS

Figure 1:
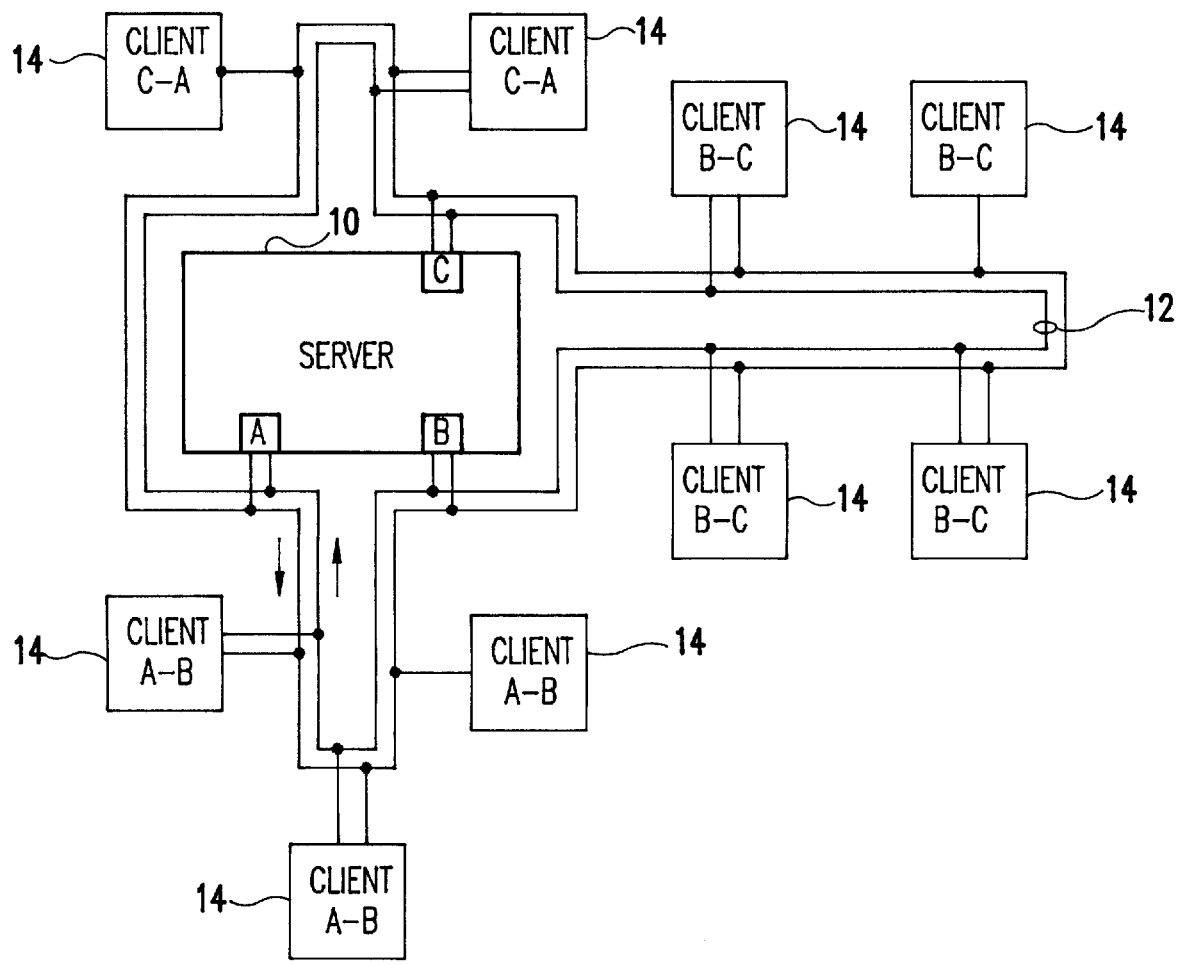
FIG. 1 is a block diagram of a server/client ring network partitioned into separate physical domains in accordance with the teachings of this invention.

Referring now to FIG. 1, a server 10 has, in this specific example of the invention, three ports labeled A, B, and C connected at physically separated points to a ring network 12, which network conforms to FDDI-II published standards. This partitions the single FDDI-II ring 12 into three spatially separated domains for bandwidth sharing.

As will be appreciated by those skilled in the art, a ring network conforming to FDDI-II standards is typically comprised of two fiber optic paths, with data transmitted in a clockwise direction in one path and in a counterclockwise direction in the other path. In this exemplary embodiment of the invention, there are three client terminals 14 connected to the ring between server ports A and B; four client terminals 14 connected to the ring between server ports B and C; and two client terminals connected to the ring between server ports C and A. As will be appreciated by those skilled in the art, FDDI-II defines two classes of stations or terminals. Class A terminals connect to both rings, and the less expensive Class B terminals connect to only one ring. Both Class A and B terminals are illustrated in the drawing.

Each separate physical connection (i.e. ports A, B, and C) provides access to a corresponding physical domain. Ports A and B provide access to the clients 14 designated A-B in the drawing. Ports B and C provide access to the clients 14 designated B-C in the drawing, and ports C and A provide access to the clients 14 designated C-A in the drawing. The server 10 transmits data from port A on the counterclockwise ring and from port B on the clockwise ring to the clients 14 marked A-B; i.e. those clients in physical domain A-B. Likewise, server 10 transmits data from ports B and C in a counterclockwise and clockwise direction, respectively, to the clients in physical domain B-C, and from ports C and A to the clients in physical domain C-A.

In the prior art implementation of FDDI-II, a channel allocator must manage disjointed bandwidth pools to prevent users from interfering with one another. That is, for isochronous communication on an FDDI-II network, the channel allocator assigns, for a particular communication, one or more of the available 16 wide band-channels in the frame that is generated once every 125 microseconds. This assigned channel or channels is reserved, until specifically released, in each successive frame generated every 125 microseconds. Thus, in the frame designated for isochronous transmission of data, a maximum of about 100 Mps of bandwidth is all the bandwidth that is nominally available because the channel allocator manages disjointed bandwidth pools by reserving bandwidth throughout the entire network in establishing a communications channel between any two points on the network.

In accordance with the teachings of this invention, the network 12 is spatially divided into physical domains by connecting the server 10 to spaced apart points on the ring, i.e. ports A, B, and C. The channel allocator function, which may be residual in server 10, limits the down link communications between server 10 and clients 14 so that isochronous transmissions from port A on the counterclockwise loop or from port B on the clockwise loop are only addressed to the clients 14 connected to the ring between port A and port B, that is, the clients marked A-B in the drawing. Similarly, down link communications from port B on the counterclockwise loop or port C on the clockwise loop are only addressed to the clients 14 between ports B and C, i.e. clients marked B-C in the drawing. Finally, down link communications from port C on the counterclockwise loop or port A on the clockwise loop are only addressed to the clients 14 connected between ports C and A, that is, the clients marked C-A. Thus, every 125 microseconds, ports A, B, and C can each use the entire 100 Mps of available bandwidth in the frame to communicate with the clients in their respective spatial domains. Thus, it will be appreciated that the effective bandwidth of the ring in FIG. 1 is 300 Mbps and that the effective bandwidth of a ring with seven spatial domains is 700 Mbps.

It will be appreciated that the invention applies to the down link communication from the server to the client. For the up link client to server communication, isochronous bandwidth cannot be reallocated in the different physical domains since the logical channel from the downstream client to the upstream server could pass through these other domains.

Similarly, for client to client communication, isochronous bandwidth cannot be reallocated in the different physical domains since the logical channel from the downstream client to the upstream client could pass through other domains.

A separate WBC or WBCs can be dedicated to this inter domain communication and managed by a traditional CA. No modifications would be required for this CA and no special communications would be necessary between this CA and the modified CAs that manage isochronous bandwidth in the physical domains. Thus, in this example of a FDDI-II ring being partitioned into eight domains with one CA dedicated to inter domain communication, a maximum of about 750 Mbps (800 Mbps—(1×6.144 Mbps×7 domains)) of isochronous bandwidth is capable of being achieved in the network.

These and other modifications may be made to the specific embodiment of the invention without departing from the spirit and scope of the invention.

We claim:

1. A method for spatial reuse of isochronous bandwidth in a ring network which includes a server and a plurality of clients connected to said server via said ring network, comprising in combination:

grouping a first set of said plurality of clients into a first domain in which said server can address each client in said first domain;

connecting a first port of said server to said ring network at a first point on said network and a second port of said server to said ring network at a second point on said ring network physically spaced from said first point;

connecting said first set of said plurality of clients to said ring network between said first point on said ring network and said second point on said ring network;

grouping a second set of said plurality of clients into a second domain in which said server can address each client in said second domain;

connecting a third port of said server at a third point on said network physically spaced from said second point on said ring network;

connecting said second set of said plurality of clients to said ring network between said second point on said ring network and said third point on said ring network;

transmitting data from said first port addressed to a client in said first domain over an isochronous channel established between said server and said client in said first domain;

transmitting data from said second port addressed to a client in said second domain over an isochronous channel established between said server and said client in said second domain where some or all the isochronous channel used for transmission of data to the client in said first domain is used for transmission of data to the client in said second domain.

2. A method for spatial reuse of isochronous bandwidth in a ring network which includes a server and a plurality of clients connected to said server via said ring network, comprising in combination:.

grouping a first set of said plurality of clients into a first domain in which said server can address each client in said first domain;

connecting a first port of said server to said ring network at a first point on said network and a second port of said server to said ring network at a second point on said ring network physically spaced from said first point;

connecting said first set of said plurality of clients to said ring network between said first point on said ring network and said second point on said ring network;

grouping a second set of said plurality of clients into a second domain in which said server can address each client in said second domain;

connecting a third port of said server at a third point on said network physically spaced from said second point on said ring network;

connecting said second set of said plurality of clients to said ring network between said second point on said ring network and said third point on said ring network;

grouping a third set of said plurality of clients into a third domain in which said server can addresses each client in said third domain;

connecting said third set of said plurality of clients to said ring network between said first point on said ring network and said third point on said ring network;

transmitting data from said first port addressed to a client in said first domain over an isochronous channel established between said server and said client in said first domain;

transmitting data from said second port addressed to a client in said second domain over an isochronous channel established between said server and said client in said second domain where some or all the isochronous channel used for transmission of data to a client in said first domain is used for transmission of data to a client in said second domain;

transmitting data from said third port addressed to a client in said third domain over an isochronous channel established between said server and said client in said third domain where some or all the isochronous channel used for transmission of data to the client in said first and second domains is used for transmission of data to the client in said third domain.

3. A method for spatial reuse of isochronous bandwidth in a ring network as in claim 1 wherein said ring network conforms to the fiber distributed data interface (FDDI-II) standard.

4. A method for spatial reuse of isochronous bandwidth in a ring network as in claim 2 wherein said ring network conforms to the fiber distributed data interface (FDDI-II) standard.

* * * * *